(12) United States Patent
Mullins et al.

(10) Patent No.: US 8,581,191 B2
(45) Date of Patent: Nov. 12, 2013

(54) STABILIZATION OF COLDSHIELD BODIES

(75) Inventors: Richard N. Mullins, Goleta, CA (US); Paul A. Drake, Santa Ynez, CA (US)

(73) Assignee: Raytheon Company, Walthem, MA (US)

(*) Notice: Subject to any disclaimer, the term of this patent is extended or adjusted under 35 U.S.C. 154(b) by 778 days.

(21) Appl. No.: 12/629,676

(22) Filed: Dec. 2, 2009

(65) Prior Publication Data
US 2011/0127430 A1    Jun. 2, 2011

(51) Int. Cl.
*G01J 5/00* (2006.01)

(52) U.S. Cl.
USPC ..................................................... 250/338.1

(58) Field of Classification Search
USPC .............................................. 250/338.1, 352
See application file for complete search history.

(56) References Cited

U.S. PATENT DOCUMENTS

| | | | |
|---|---|---|---|
| 4,113,359 A | 9/1978 | Koike et al. | |
| 5,293,542 A | 3/1994 | Ise et al. | |
| 5,371,369 A | 12/1994 | Kent | |
| 5,404,016 A * | 4/1995 | Boyd et al. | 250/352 |
| 5,966,945 A | 10/1999 | Mengel et al. | |
| 5,994,699 A | 11/1999 | Akagawa | |
| 6,133,569 A | 10/2000 | Shoda et al. | |
| 6,174,061 B1 | 1/2001 | Cooper | |
| 6,707,044 B2 | 3/2004 | Lannestedt et al. | |
| 7,157,706 B2 | 1/2007 | Gat et al. | |
| 7,245,347 B2 | 7/2007 | Lundgren | |
| 7,297,951 B2 | 11/2007 | Chen et al. | |
| 7,427,758 B2 * | 9/2008 | Garman et al. | 250/338.1 |
| 7,630,148 B1 | 12/2009 | Yang et al. | |
| 7,655,911 B2 | 2/2010 | Murphy et al. | |
| 7,679,839 B2 | 3/2010 | Polyakov et al. | |
| 2001/0046566 A1 | 11/2001 | Chu et al. | |
| 2003/0161049 A1 | 8/2003 | Okada et al. | |
| 2004/0211907 A1 | 10/2004 | Wellman et al. | |
| 2004/0238741 A1 | 12/2004 | Gat et al. | |
| 2006/0255275 A1 | 11/2006 | Garman et al. | |
| 2007/0045557 A1 | 3/2007 | Angel et al. | |
| 2008/0304126 A1 | 12/2008 | Powell et al. | |

OTHER PUBLICATIONS

U.S. Appl. No. 12/762,161, entitled "Variable Aperture Mechanism Retention Device", by Richard N. Mullins, filed Apr. 16, 2010, with drawings (27 pages).

\* cited by examiner

*Primary Examiner* — David Porta
*Assistant Examiner* — Edwin Gunberg
(74) *Attorney, Agent, or Firm* — Thorpe North & Western LLP

(57) ABSTRACT

According to one embodiment, an optical device comprises a housing. A structure is disposed within the housing. The structure has an optical entrance whereby radiation may enter. An aperture is located between the optical entrance and a radiation detector. At least one brace is rigidly coupled to the structure and the housing.

20 Claims, 4 Drawing Sheets

STABILIZATION OF COLDSHIELD BODIES

GOVERNMENT RIGHTS

This invention was made with government support under government contract number H94003-04-D-0006-0018. The Government has certain rights in this invention.

TECHNICAL FIELD

This invention relates generally to the field of optical devices and more specifically to stabilization of coldshield bodies.

BACKGROUND

Optical devices, such as infrared detectors, are useful for many applications, including imaging equipment, surveillance equipment, targeting equipment, and military applications. Certain optical devices may be subject to vibrations and shocks that may disrupt device performance.

SUMMARY OF THE DISCLOSURE

According to one embodiment, an optical device comprises a housing. A structure is disposed within the housing. The structure has an optical entrance whereby radiation may enter. An aperture is located between the optical entrance and a radiation detector. At least one brace is rigidly coupled to the structure and the housing.

Certain embodiments of the invention may provide one or more technical advantages. A technical advantage of one embodiment may include the capability to stabilize a structure with a variable aperture within a housing. Another technical advantage of one embodiment may include the capability to reduce movement of a structure and minimize heat transfer to and from the structure. Yet another technical advantage of one embodiment may include the capability to provide stabilization and support in two directions.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
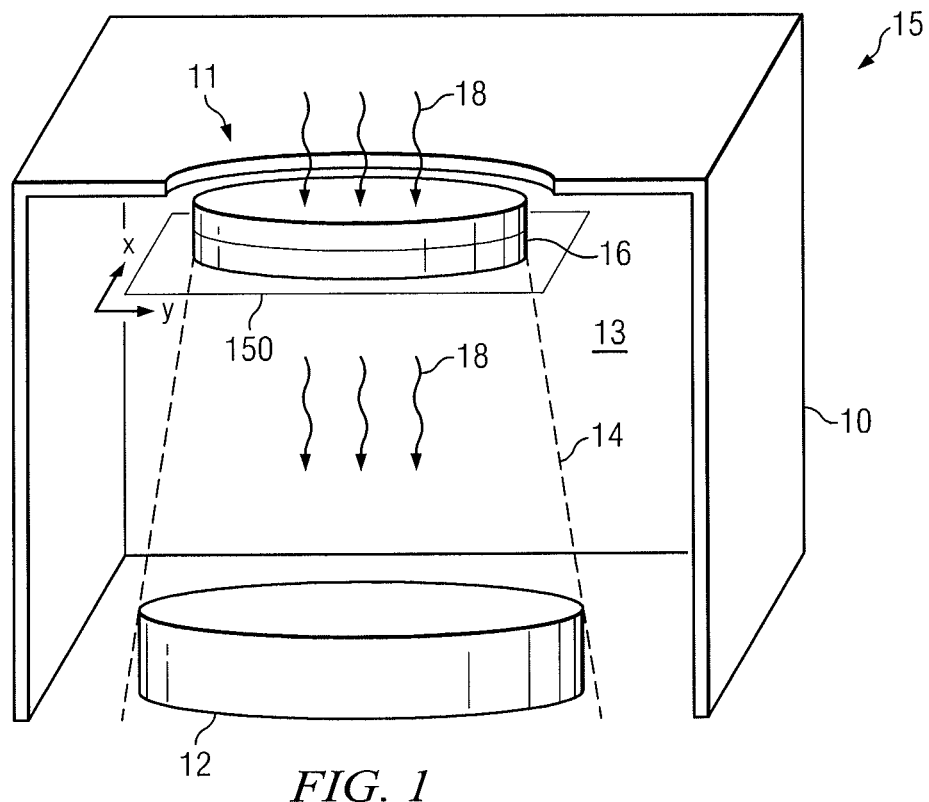
FIG. 1 shows one embodiment of an optical device.

FIG. 1 shows one embodiment of an optical device 15. Optical device 15 includes a radiation detector 12, a structure 14, and an aperture 16 in a vacuum chamber 13 within a housing 10. In certain embodiments, structure 14 is coupled to detector 12 and/or aperture 16. Housing 10 includes window 11 that allows radiation 18 to reach aperture 16.

Housing 10 may be any suitable enclosure for the components of optical device 15. In some embodiments, housing 10 provides an environmentally sealed and controlled enclosure for components of optical device 15, including radiation detector 12, structure 14, and aperture 16. Housing 10 may comprise any suitable material, such as plastic or metal, and may be any suitable shape, such as tubular or cubic. In certain embodiments, housing 10 comprises a Dewar for an infrared detector, such as a cryogenically-cooled Dewar.

Figure 2:
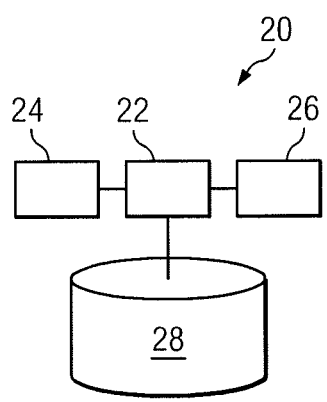
FIG. 2 shows a computer system according to one embodiment.

Although not pictured in FIG. 1, embodiments of optical device 15 may also include one or more computers, such as computer system 20 shown in FIG. 2. Computer system 20 may include processors 22, input/output devices 24, communications links 26, and memories 28. In other embodiments, computer system 20 may include more, less, or other components. Computer system 20 may be operable to perform one or more operations of various embodiments. Although the embodiment shown in FIG. 2 provides one example of computer system 20 that may be used with other embodiments, such other embodiments may additionally utilize computers other than the computer system 20. Additionally, embodiments may also employ multiple computer systems 20 or other computers networked together in a computer network. Multiple computer systems 20 or other computers may be networked through the Internet and/or in a client-server network. Embodiments of the invention may also be used with a combination of separate computer networks each linked together by a private or a public network.

Several embodiments may include processors 22 operable to execute logic contained within a medium. Examples of processor 22 include one or more microprocessors, one or more applications, and/or other logic. Computer system 20 may include one or multiple processors 22.

Several embodiments may include one or more input/output devices. Input/output devices 24 may include any device or interface operable to enable communication between computer system 20 and external components, including communication with a user or another system. Example input/output devices 24 may include, but are not limited to, a mouse, keyboard, display, and printer.

Communications links 26 may be connected to any number and combination of wireline and/or wireless networks suitable for data transmission. Communications links 26 may, for example, communicate Internet protocol packets, frame relay frames, asynchronous transfer mode cells, and/or other suitable information between network addresses. Communications links 26 may be connected to a computer network or a variety of other communicative platforms including, but not limited to, a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. In one example embodiment, communications links 26 may be connected to one or more networks 800 of FIG. 1.

Several embodiments may include logic contained within a medium. Logic may include hardware, software, and/or other logic. Logic may be encoded in one or more tangible media and may perform operations when executed by a computer. Logic may include a computer program, software, computer executable instructions, and/or instructions capable of being executed by computer system 10. Example logic may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 28. Memory 28 may comprise one or more tangible, computer-readable, and/or computer-executable storage medium. Examples of memory 28 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Computer system 20 may include any suitable hardware or software for using, controlling, monitoring, maintaining, or otherwise operating optical device 15 in any appropriate manner. For example, computer system 20 may be operable to select or specify a target, field of view, lens, f-number, entrance pupil, aperture size, or wavelength associated with optical device 15. Computer system 20 may also be operable to control a variable aperture 16. For example, in one embodiment, computer system 20 may be operable to selectively open, close, and/or hold particular microshutter cells in a microshutter array to provide a variable-size entrance pupil or aperture for optical device 15. Computer system 20 may also be operable to receive, process, store, and communicate data sent, received, or generated by optical device 15. Computer system 20 may be located within or outside housing 10 and may be physically and/or electronically coupled to the components of optical device 15 in any suitable manner. In certain embodiments, such computer systems are located outside housing 10 to avoid excess heat or radiation load on the components of optical device 15.

Returning to FIG. 1, In certain embodiments, housing 10 includes a window 11 that allows radiation 18 to pass into housing 10, reaching other components of optical device 15. Window 11 may be optically aligned with particular components of optical device 15, such as aperture 16, to facilitate transmission of radiation 18 to radiation detector 12.

Radiation detector 12 may be any device that detects electromagnetic radiation 18, such as gamma rays, visible light, or infrared radiation. Radiation detector 12 may include any appropriate components for detecting radiation 18, including radiation-sensitive photocells, sensors, one or more lenses, computers, processors, electronics, and other components.

In some embodiments, radiation detector 12 is capable of detecting multiple wavelengths. Examples of radiation detector 12 may include an infrared sensor or camera capable of detecting multiple wavelengths of infrared radiation, such as long and short infrared wavelengths. Additionally, examples of radiation detector 12 may include a single-color, two-color, or dual band mid-long infrared camera or detector.

In certain embodiments, radiation detector 12 may include one or more cameras, such as infrared cameras, with multiple lenses. In one embodiment radiation detector 12 includes an infrared camera to be used in a wide variety of rapidly-changing target-scene radiation conditions. In such an embodiment, radiation detector 12 may have interchangeable lenses with different f-numbers. As an additional example, radiation detector 12 may include a two-color infrared camera with one or more wide-angle and telescoping lenses.

Structure 14 may include any suitable vessel for supporting and/or protecting components of optical device 15, such as radiation detector 12 and aperture 16. In certain embodiments, structure 14 is designed to reduce unwanted radiation (e.g., radiation not emitted from the target object or field) emanating from housing 10 or other components associated with optical device 15 from reaching radiation detector 12. In such embodiments, structure 14 may be any appropriate structure designed to block or otherwise prevent radiation detector 12 from "seeing" undesirable radiation. Structure 14 may comprise any suitable material, such as aluminum, nickel, or copper.

As mentioned above, in certain embodiments, radiation detector 12 is an infrared detector with infrared-sensitive photocells. Such photocells are very sensitive to thermal infrared radiation emitted by any object at a temperature above absolute zero, including components of optical device 15. Because thermal infrared radiation decreases rapidly as the temperature of an object decreases, operation of radiation detector 12 may be improved by cooling structure 14 to prevent undesirable thermal radiation from reaching radiation detector.

Accordingly, teachings of certain embodiments recognize that structure 14 may comprise a cold shield and/or a cold stop wherein a cooling system is used to maintain structure 14 at a fixed temperature. In some embodiments, structure 14 is cooled to a certain temperature that allows only a negligible amount of radiation to reach radiation detector 12. Moreover, because a fixed temperature may have a known effect on radiation detector 12, that effect can be accounted for and removed when the images are processed.

Similarly, radiation detector 12, aperture 16, and other components of optical device 15 may also be cooled to reduce unwanted radiation and improve the radiation sensitivity of optical device 15. For example, structure 14 and/or other components of optical device 15 may be cryogenically cooled to the temperature of radiation detector 12. Any suitable cooling device or method may be used in such embodiments. For example, a thermoelectric cooler, such as a Peltier cooler, may be used to cool structure 14 and other components of optical device 15. Structure 14 and other components of optical device 15 may be integrated into Dewars and may include liquid nitrogen or liquid helium, Stirling cryo-generators, Gifford-McMahon mechanical coolers, and other such devices.

Some or all components of optical device 15 may be maintained in a vacuum chamber 13. Within vacuum chamber 13, structure 14, radiation detector 12, and aperture 16 may be maintained at a low or cryogenic temperature, based on photocell requirements and the desired performance. Vacuum chamber 13 may be a chamber defined by housing 10. Vacuum chamber 13 may advantageously reduce thermal load on cooling systems associated with components of optical device 15.

Aperture 16 may include any suitable device to receive, reflect, and/or block incoming radiation 18. Aperture 16 may be coupled to or mounted on structure 14 in any appropriate manner to provide an entrance pupil or aperture for optical device 15. Alternatively, aperture 16 may be coupled to or mounted on any other suitable structure associated with optical device 15, such as housing 10 or window 11.

In some embodiments, aperture 16 may be a variable aperture. A variable aperture may include any aperture and variable aperture mechanism operable to selectively receive and/or block incoming radiation 18. For example, in one embodiment, a variable aperture may include a microshutter array comprising microshutter cells that may be selectively actuated by an electromagnetic field. In some embodiments, the microshutter array may be configured to provide an entrance pupil or aperture of nearly any size that selectively blocks or reflects certain incoming radiation 18.

In some deployments, optical device 15 may be subject to various design and performance requirements. One such requirement may include restrictions on aperture movement due to vibration and shock. For example, in some Dewar packages, requirements may control both movement of radiation detector 12 in an x-y plane 150 and movement of aperture 16 in the x-y plane 150 relative to radiation detector 12.

However, adding a variable aperture 16 to optical device 15 may add mass to the top of structure 14. In turn, a heavier optical device 15 may increase movement of aperture 16 due to vibration and shock. For example, if structure 14 is secured to housing 10 near radiation detector 12, then movement of aperture 16 may be magnified due to the weight of aperture 16 and the length of structure 14 between radiation detector 12 and aperture 16.

Accordingly, teachings of certain embodiments recognize the ability to stabilize structure 14 within housing 10. In one example embodiment, a strut may be placed between housing 10 and structure 14 near aperture 16. Teachings of certain embodiments recognize that a strut coupled to structure 14 near aperture 16 may reduce movement of aperture 16 due to vibration and shock.

However, as explained above, example embodiments of structure 14 may include cold shield and/or a cold stop wherein a cooling system is used to maintain structure 14 at a fixed temperature. Coupling a strut to structure 14 may increase heat transfer between structure 14 and housing 10. For example, in one embodiment, housing 10 may have a temperature near an ambient outside temperature, and structure 14 may have a temperature substantially lower than the ambient outside temperature. Coupling a strut between housing 10 and structure 14 may allow heat transfer from housing 10 to structure 14, thus inhibiting the ability of structure 14 to maintain a specified, fixed temperature.

Additionally, heat transfer through the strut increases as the thickness of the strut increases. In some deployments, the thickness necessary for a single strut to sufficiently reduce movement of aperture 16 may cause an unacceptable transfer of thermal energy between housing 10 and structure 14. Accordingly, teachings of certain embodiments recognize the ability to provide a strut that reduces movement of aperture 16 and minimizes heat transfer from housing 10 to structure 14.

Figure 3A:
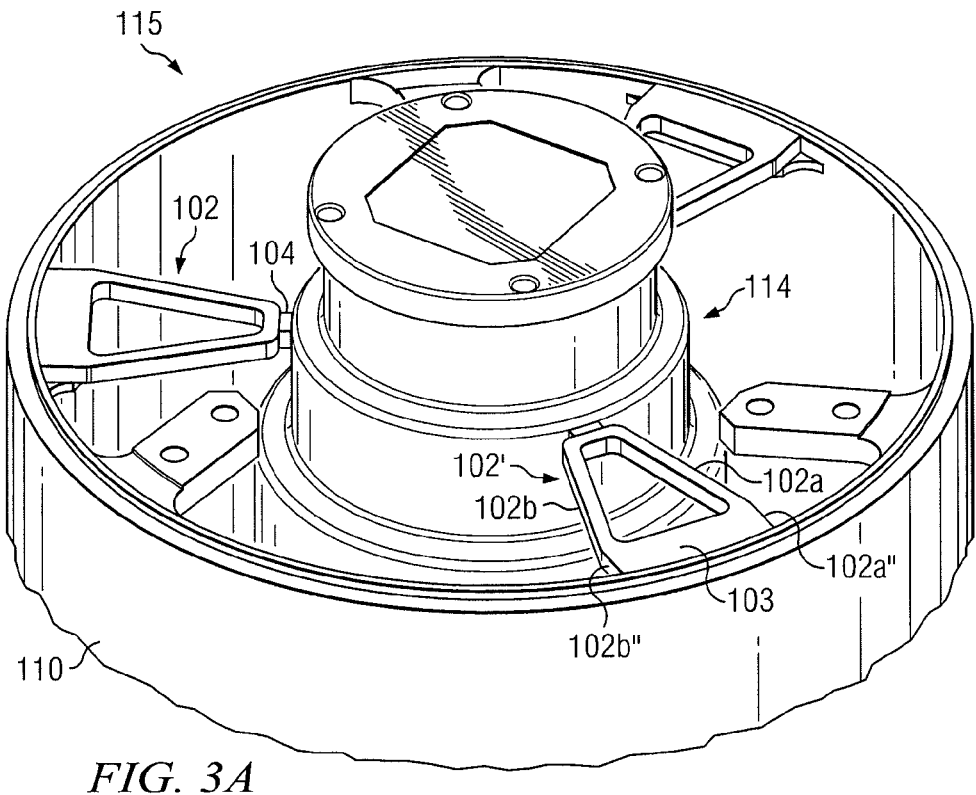
FIGS. 3A and 3B show another embodiment of an optical device featuring a structure within a housing.
Figure 3B:
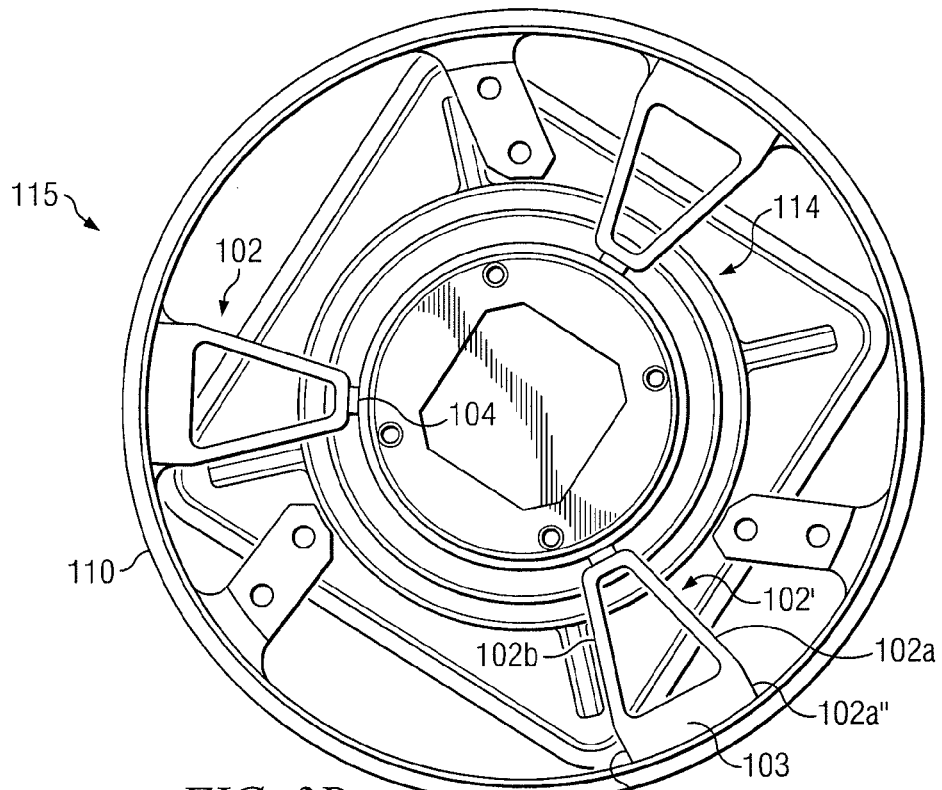
Figure 4:
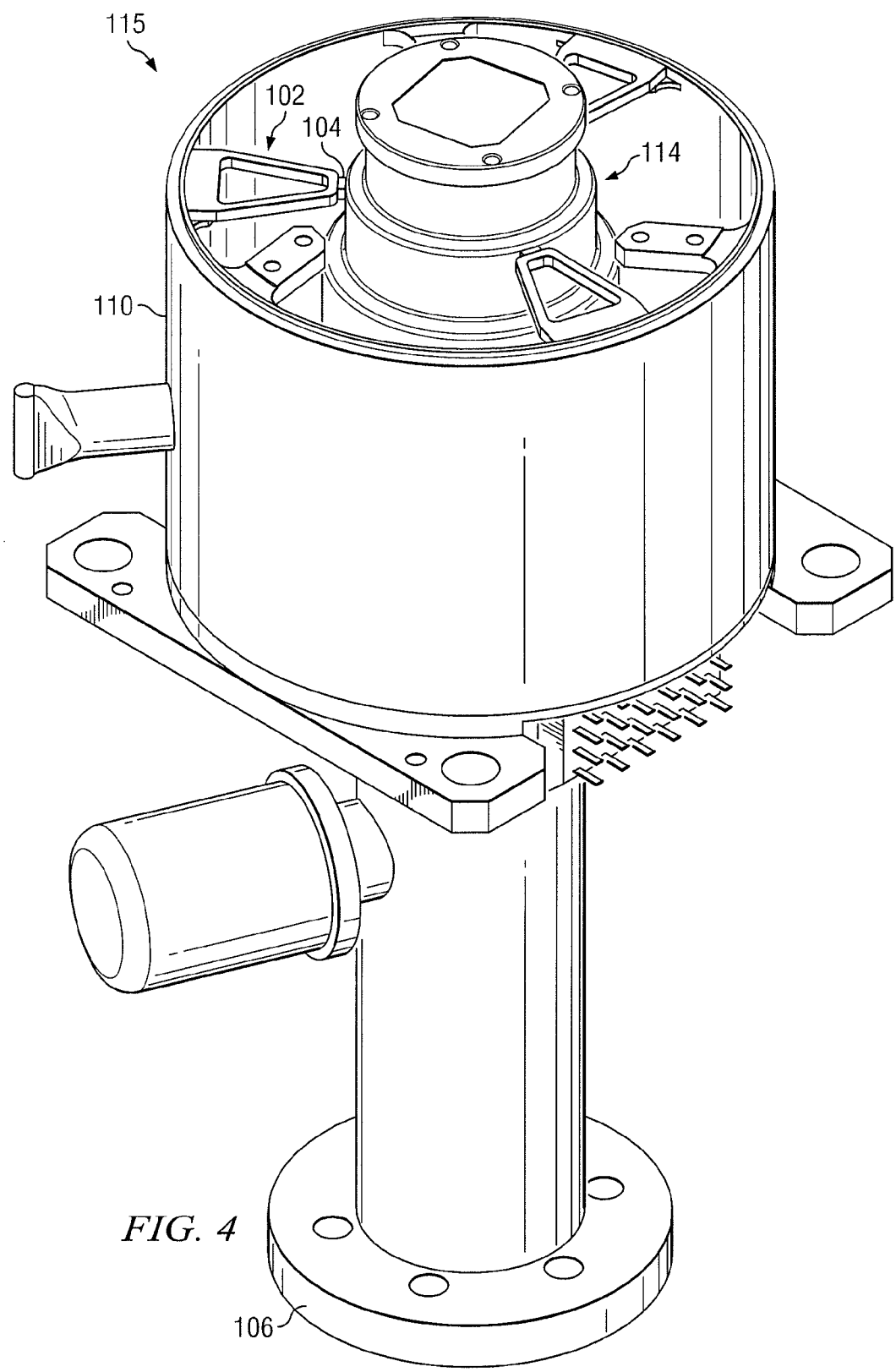
FIG. 4 shows the optical device of FIGS. 3A and 3B mounted to a base.

FIGS. 3A and 3B show another embodiment of an optical device 115 featuring a structure 114 within a housing 110. FIG. 3A shows a perspective cross-section view, and FIG. 3B shows a cross-section top view. FIG. 4 shows the optical device 115 of FIGS. 3A and 3B mounted to a base 106. Base 106 may include any suitable base for securing optical device 115. In some embodiments, base 106 may be secured to an object that causes vibrations or shocks to optical device 115.

In one embodiment, optical device 115 features one or more braces 102. Braces 102 may represent any suitable members for mounting, supporting, coupling, stabilizing, or protecting components of optical device 15, such as radiation detector 12, structure 14, and aperture 16. Braces 102 may comprise any suitable material, such as plastic or metal.

In the illustrated embodiment, brace 102 is a bifurcated brace. Teachings of certain embodiments recognize that a bifurcated brace may reduce movement of structure 114 and minimizes heat transfer from housing 110 to structure 114. For example, teachings of certain embodiments recognize that a bifurcated brace may provide additional support by coupling to two positions on housing 110. Teachings of certain embodiments further recognize that a bifurcated brace may provide additional structural support and stabilization. In addition, teachings of certain embodiments recognize that a bifurcated brace may provide structural support with a reduced cross-sectional area.

Figure 3C:
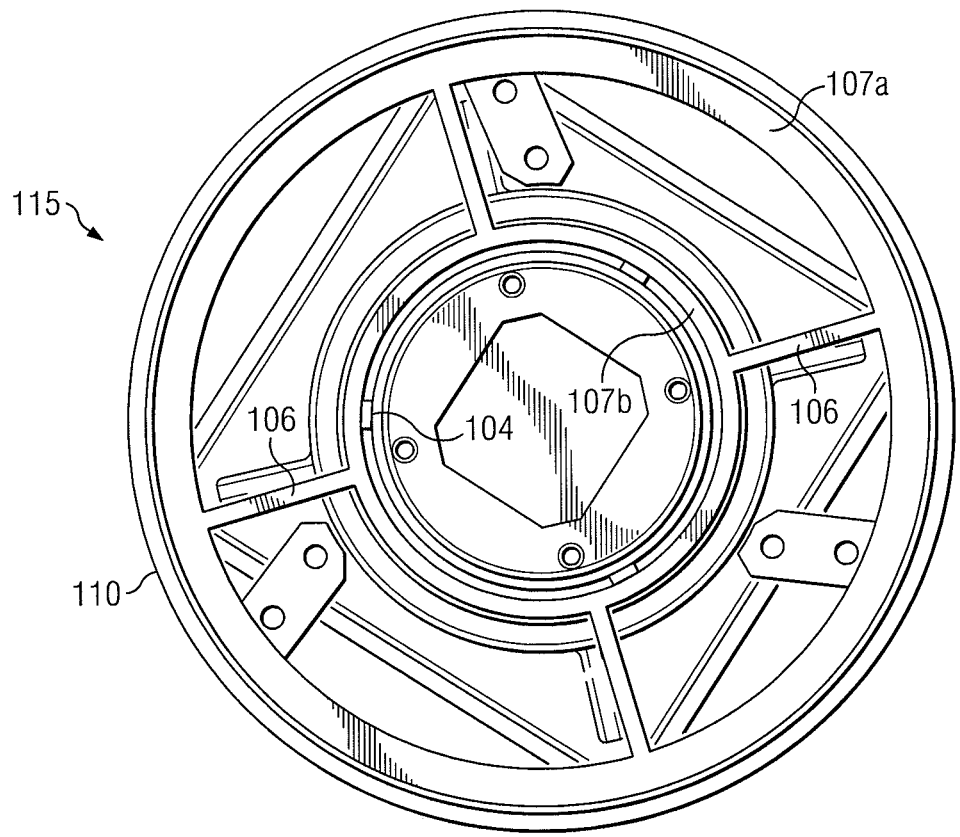
FIG. 3C shows another embodiment of an optical device featuring a structure within a housing.

However, embodiments are not limited to bifurcated braces. Rather, teachings of certain embodiments recognize the use of non-bifurcated braces. For example, as discussed below with regards to FIG. 3C, non-bifurcated braces may provide benefits similar to those provided by bifurcated braces. For example, FIG. 3C illustrates one embodiment of the optical device 115 with single-strut braces 106.

Returning to FIGS. 3A and 3B, the bifurcated brace 102 includes a first rigid member 102a and a second rigid member 102b. The first rigid member 102a and the second rigid member 102b are rigidly coupled together at an inside end 102'. The first and second rigid members 102a and 102b have first and second outside ends 102a" and 102b", respectively, opposite inside end 102'.

In the illustrated embodiment, brace 102 is rigidly coupled to structure 114 at inside end 102' and is rigidly coupled to housing 110 at outside ends 102a" and 102b". In this example, a cross member 103 is rigidly coupled between outside ends 102a" and 102b". In the illustrated example, cross member 103 is integrated with rigid members 102a and 102b to form brace 102. In addition, cross member 103 may be configured to be rigidly coupled against housing 110.

In the illustrated embodiment, rigid members 102a and 102b are not parallel; rather, rigid members 102a and 102b form an angle at inside end 102'. Teachings of certain embodiments recognize that positioning rigid members 102a and 102b to form an angle at inside end 102' may allow members 102a and 102b to provide stabilization and support in two directions.

Brace 102 may be coupled to housing 110 and structure 114 using any suitable mechanism. In some embodiments, brace 102 may be rigidly coupled to housing 110 and/or structure 114 by bonding with an adhesive, welding, or brazing. Teachings of certain embodiments recognize that bonding brace 102 to structure 114 may provide additional thermal resistance and reduce heat transfer between housing 110 and structure 114. In some embodiments, a thermally-insulating compound 104 may be disposed between brace 102 and structure 114. Thermally-insulting compound 104 may include any suitable material for reducing heat transfer between brace 102 and structure 114.

FIG. 3C shows a modified embodiment of the optical device 115 with single-strut braces 106, an outer ring 107a, and an inner ring 107b. In the illustrated embodiment, four single-strut braces 106, outer ring 107a, and inner ring 107b form a structure for mounting, supporting, coupling, stabilizing, or protecting components of optical device 15, such as radiation detector 12, structure 14, and aperture 16. Although the illustrated embodiment features four single-strut braces 106, any suitable number of braces 106 may be used. Although the illustrated embodiment features outer ring 107a and inner ring 107b, teachings of certain embodiments recognize that single-strut braces 106 may be used without outer ring 107a and inner ring 107b.

Braces 106, an outer ring 107a, and an inner ring 107b may comprise any suitable material, such as plastic or metal. Brace 106, outer ring 107a, and inner ring 107b may be of any suitable shape. As one non-limiting example, outer ring 107a and inner ring 107b are not limited to circular rings but rather may be of any suitable shape.

Outer ring 107a and inner ring 107b may be coupled to housing 110 and structure 114 using any suitable mechanism. In some embodiments, outer ring 107a may be rigidly coupled to housing 110 and/or structure 114 by bonding with an adhesive, welding, or brazing. Teachings of certain embodiments recognize that bonding inner ring 107b to structure 114 may provide additional thermal resistance and reduce heat transfer between housing 110 and structure 114. In some embodiments, a thermally-insulating compound 104 may be disposed between inner ring 107b and structure 114. Thermally-insulting compound 104 may include any suitable material for reducing heat transfer between inner ring 107b and structure 114.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. An optical device, comprising:
   a housing;
   a structure disposed within the housing having an optical entrance whereby radiation may enter;
   a radiation detector disposed within the housing;
   an aperture coupled to the structure and located between the optical entrance and the radiation detector; and
   at least one brace rigidly and fixedly coupled to an end of the housing and to the structure at a location proximate the aperture to minimize movement of the aperture due to vibration or shock.

2. The optical device of claim 1, wherein the brace is a bifurcated brace, the bifurcated brace comprising:
   a first rigid member comprising an inside end and a first outside end opposite the inside end, wherein the inside end is configured to rigidly couple to the structure at a first point;
   a second rigid member rigidly coupled to the first rigid member at the first end such that an angle is formed between the first and second rigid members, the second rigid member further comprising a second outside end opposite the inside end, wherein the first and second outside ends are configured to rigidly couple to the housing.

3. The optical device of claim 2, the bifurcated brace further comprising a cross member rigidly coupled to the first rigid member proximate to the first outside end and the second rigid member proximate to the second outside end.

4. The optical device of claim 1, the at least one brace comprising:
   an inner ring rigidly coupled to the structure;
   an outer ring rigidly coupled to the housing; and
   one or more struts rigidly coupled to the structure and to the housing.

5. The optical device of claim 1, wherein the brace is rigidly coupled to the structure by bonding using one of a selected adhesive, welding, and brazing.

6. The optical device of claim 1, further comprising a thermally-insulating compound disposed between the structure and the brace, the thermally-insulating compound operable to reduce heat transfer between the brace and the structure.

7. The optical device of claim 1, wherein the housing is a vacuum chamber, the housing further comprising a window whereby radiation may enter.

8. The optical device of claim 7, wherein:
   the window is optically aligned with the optical entrance; and
   the aperture is coupled to the window.

9. The optical device of claim 1, wherein the structure is cryogenically cooled.

10. The optical device of claim 1, wherein the structure is a radiation shield.

11. A device for stabilizing an optical device comprising:
    a rigid member coupling a housing and a structure disposed within the housing, the rigid member comprising an inside end and an outside end opposite the inside end, wherein the inside end is configured to rigidly and fixedly couple to the structure at a first point proximate an aperture coupled to the structure, the structure having an optical entrance whereby radiation may enter and be detected by a radiation detector disposed within the housing, and the aperture being disposed between the optical entrance and the radiation detector, wherein the outside end is configured to rigidly and fixedly couple to an end of the housing, such that the coupling of the rigid member to the housing and the structure minimizes movement of the aperture due to vibration or shock.

12. The device of claim 11, the rigid member comprising:
    a first rigid member comprising an inside end and a first outside end opposite the inside end, wherein the inside end is configured to rigidly couple to a structure at a first point, the structure being disposed within a housing and having an optical entrance whereby radiation may enter and be detected by a radiation detector disposed within the housing; and
    a second rigid member rigidly coupled to the first rigid member at the first end such that an angle is formed between the first and second rigid members, the second rigid member further comprising a second outside end opposite the inside end, wherein the first and second outside ends are configured to rigidly couple to the housing.

13. The device of claim 11, further comprising a cross member rigidly coupled to the first rigid member proximate to the first outside end and the second rigid member proximate to the second outside end.

14. The device of claim 11, further comprising:
   an inner ring rigidly configured to be coupled to the structure; and
   an outer ring rigidly configured to be coupled to the housing, wherein the rigid member is rigidly coupled between the inner ring and the outer ring.

15. The device of claim 11, wherein the rigid member is rigidly coupled to the structure by bonding using one of a selected adhesive, welding, and brazing.

16. The device of claim 11, further comprising a thermally-insulating compound disposed between the structure and the rigid member, the thermally-insulating compound operable to reduce heat transfer between the rigid member and the structure.

17. The device of claim 11, wherein the housing is a vacuum chamber, the housing further comprising a window whereby radiation may enter.

18. The device of claim 17, wherein:
   the window is optically aligned with the optical entrance; and
   the aperture is coupled to the window.

19. The device of claim 11, wherein the structure is cryogenically cooled.

20. The device of claim 11, wherein the structure is a radiation shield.

* * * * *